US009720942B2

(12) United States Patent
Kaufmann et al.

(10) Patent No.: US 9,720,942 B2
(45) Date of Patent: *Aug. 1, 2017

(54) TIME SLIDER OPERATOR FOR TEMPORAL DATA AGGREGATION

(71) Applicants: Martin Kaufmann, Zurich (CH); Norman May, Karlsruhe (DE); Andreas Tonder, Weinheim (DE); Donald Kossmann, Zurich (CH)

(72) Inventors: Martin Kaufmann, Zurich (CH); Norman May, Karlsruhe (DE); Andreas Tonder, Weinheim (DE); Donald Kossmann, Zurich (CH)

(73) Assignee: SAP SE, Walldorf (DE)

(*) Notice: Subject to any disclaimer, the term of this patent is extended or adjusted under 35 U.S.C. 154(b) by 362 days.

This patent is subject to a terminal disclaimer.

(21) Appl. No.: 14/265,042

(22) Filed: Apr. 29, 2014

(65) Prior Publication Data

US 2014/0236912 A1  Aug. 21, 2014

Related U.S. Application Data

(63) Continuation of application No. 13/336,951, filed on Dec. 23, 2011, now Pat. No. 8,751,525.

(51) Int. Cl.
G06F 17/30 (2006.01)

(52) U.S. Cl.
CPC .. *G06F 17/30309* (2013.01); *G06F 17/30353* (2013.01); *G06F 17/30371* (2013.01); *G06F 17/30551* (2013.01)

(58) Field of Classification Search
CPC .............. G06F 3/067; G06F 17/30336; G06F 17/30321; G06F 8/71
USPC ................................ 707/687–696, 705–780
See application file for complete search history.

(56) References Cited

U.S. PATENT DOCUMENTS

| 5,745,904 | A | 4/1998 | King et al. | |
|---|---|---|---|---|
| 7,769,732 | B2 | 8/2010 | Cox et al. | |
| 8,010,554 | B1 * | 8/2011 | Zhou ................ | G06F 17/30551 707/769 |
| 8,156,083 | B2 * | 4/2012 | Banerjee .......... | G06F 17/30306 707/679 |

(Continued)

OTHER PUBLICATIONS

Yang et al. "Incremental Computation and Maintenance of Temporal Aggregates." VLDB Journal, Springer Verlag, Berlin, DE, vol. 12, No. 3, Oct. 1, 2003 (Oct. 1, 2003), pp. 262-283, XP058144461,ISSN: 1066-8888, DOI: 10.1007/S00778-003-0107-Z.

*Primary Examiner* — Michelle Owyang
(74) *Attorney, Agent, or Firm* — Mintz Levin Cohn Ferris Glovsky and Popeo, P.C.

(57) ABSTRACT

Calculation of aggregated values in a history database table can be optimized using an approach in which an ordered history table is accessed. The ordered history table can include a sequential listing of commit identifiers associated with updates, insertions, and/or deletions to values in the database table. The ordered history table can be traversed in a single pass to calculate an aggregation function using an optimized algorithm. The optimized algorithm can enable calculation of an aggregated metric of the values based on a selected method for tracking invalidated values to their corresponding commit identifiers. The calculated metric is generated for a current version of the database table; and promoted.

18 Claims, 13 Drawing Sheets

(56) References Cited

U.S. PATENT DOCUMENTS

| | | | |
|---|---|---|---|
| 8,219,522 B2 | 7/2012 | Johnston et al. | |
| 8,301,652 B2* | 10/2012 | Zhou ................ | G06F 17/30551 |
| | | | 707/769 |
| 8,589,357 B2 | 11/2013 | Radhakrishnan et al. | |
| 2011/0071986 A1 | 3/2011 | Schmidt et al. | |
| 2012/0330996 A1 | 12/2012 | Chang et al. | |

* cited by examiner

```
select max(agg.total)
from
(
  select count(*) as total, tr.commit_id
  from stock('REQUEST_FLAGS'='ALLROWS') st,
       transaction_history tr
  where st.on_stock = 0
  and st."$validfrom$" <= tr.commit_id
  and (tr.commit_id <= st."$validto$" or st."$validto$" is null)
  and
       not(st."$validto$" < [T_BEGIN] or st."$validfrom$" > [T_END])
  group by tr.commit_id
) agg
```

| Pos | ID | value | CID from | CID To |
|---|---|---|---|---|
| 1 | 1 | 2 | 2 | 3 |
| 2 | 2 | 3 | 2 | 4 |
| 3 | 3 | 2 | 3 | - |
| 4 | 1 | 5 | 4 | - |

| ID | value |
|----|-------|
| 1  | 2     |
| 2  | 3     |
| 3  | 2     |

CID: 3

FIG. 6B (602)

| CID To | Pos    |
|--------|--------|
| 3      | 1      |
| 4      | 2      |
| 6      | 6, 7, 8|
| 7      | 10     |

FIG. 6C (604)

| Pos | CID 1 Invalid | CID 2 Pos | CID 2 Invalid | CID 3 Pos | CID 3 Invalid | CID 4 Pos | CID 4 Invalid |
|-----|---------------|-----------|---------------|-----------|---------------|-----------|---------------|
| 1   | false         | 1         | false         | 1         | true          | 1         | false         |
| 2   | false         | 2         | false         | 2         | false         | 2         | true          |
| 3   | false         | 3         | false         | 3         | false         | 3         | false         |
| 4   | false         | 4         | false         | 4         | false         | 4         | false         |
| 5   | false         | 5         | false         | 5         | false         | 5         | false         |

```
select max(agg.total)
from
(
    select count(*) as total, tr.commit_id
    from order_line('REQUEST_FLAGS'='ALLROWS') li,
    transaction_history tr
    where li.ol_delivery_d is null
    and li."$validfrom$" <= tr.commit_id
    and (tr.commit_id <= li."$validto$" or li."$validto$" is
null)
    and not(li."$validto$" < [T_BEGIN] or li."$validfrom$" >
[T_END])
    group by tr.commit_id
) agg
```

```
select max(total) from
    select count(*) as total
    from order_line li VISIBLE BETWEEN [T_BEGIN] AND
[T_END]
    where li.ol_delivery_d is null
    group by li.CID()
```

TIME SLIDER OPERATOR FOR TEMPORAL DATA AGGREGATION

CROSS REFERENCE TO RELATED APPLICATION

This is a continuation of U.S. application Ser. No. 13/336,951 filed Dec. 23, 2011 entitled TIME SLIDER OPERATOR FOR TEMPORAL DATA AGGREGATION, the disclosure of which is incorporated herein by reference.

TECHNICAL FIELD

The subject matter described herein relates to operators for use in calculating aggregation metrics in relational databases.

BACKGROUND

A number of currently available computer applications offer an ability to restore an historic snapshot of a database. In effect, the application allows the ability to "time travel" by viewing a snapshot of the data at a given point in time. Other related database functionality can include the ability to aggregate on the state of many historic states of the data, which can be referred to as temporal aggregation.

In modern high performance relational databases, isolation of concurrent transactions can be an important requirement for correct execution of transactions. Without transactional isolation, concurrently executed transactions can be caused read an inconsistent intermediate state written by one or more transactions or one or more states caused by one or more transactions that is or are later aborted and rolled back. This can be referred to as a "dirty read." Multi version concurrency control approaches can be employed to ensure consistent read operations. An important consideration for a concurrency control mechanism can be the minimization of negative performance impacts. With multi version concurrency control, concurrent read operations can advantageously see a consistent view of the database without blocking concurrent write operations. Such an approach can allow a higher degree of concurrency compared to concurrency control based on shared read locks. With multi version concurrency control, updates are implemented not by overwriting existing records but by inserting new versions. A transaction may write a new version of some data item while concurrent transactions still have read access to previous versions of the data item. Typically, some kind of timestamp (or equivalent mechanism) is associated with each version. This temporal information can be used to determine which versions are visible for which transactions. Deletions can be implemented by inserting a deletion version or by some other mechanism that indicates that the previous version is no longer visible to subsequent transactions.

To keep track of transactions and to implement timestamps for multi version concurrency control, a transaction manager or comparable functionality of a database management system can maintain two types of identifiers: a transaction identifier (TID), which is an integer number that reflects the sequence of starting points of write transactions and which is increased whenever a write transaction starts or when a read transaction is transformed into a write transaction, and a commit identifier (CID), which can be a value (e.g. an integer, a real number, etc.) that reflects the commit sequence of write transactions and that is amenable to being sorted in a sequential order. A transaction can be either a read transaction or a write transaction (which can include adding, deleting, or changing content to a table). In general, a transaction may start as a read transaction but then be promoted into a write transaction by the transaction manager. The TID can be assigned to the write transaction as its unique identifier. A TID can in some examples be used to store the transaction that made an uncommitted change. The transaction manager can internally retain a maximum CID, i.e. the sequence number of the most recent commit. When a transaction is committed, the maximum CID can be increased and the new value can be assigned to the committed transaction. The CID can thereby be considered as equivalent to a commit timestamp.

SUMMARY

In one aspect, a method includes accessing an ordered history table of a database. The ordered history table includes a plurality of commit identifiers associated with one or more of updates, insertions, and deletions to values in the database table. The ordered history table also includes a sequential listing of the commit identifiers associated with first occurrences of changes to one or more of the values. The ordered history table is traversed in a single pass to calculate an aggregation function using an optimized algorithm. The optimized algorithm enables calculation of an aggregated metric of the values based on a selected method for tracking invalidated values to their corresponding commit identifiers. The calculated metric is generated for a current version of the database and then promoted.

In some variations or the current subject matter, one or more of the following features can optionally be included in any feasible combination. The promoting can optionally include one or more of storing the calculated metric, presenting the calculated metric via a user interface display, and sending an electronic message comprising the calculated metric. The algorithm can optionally include an invalidation index and a data structure, which is optimized for a specific aggregation function, to store aggregated values. The optimized algorithm can optionally include one or more of generating an invalidation index, generating a separate bitlist for each of the commit identifiers, and generating a previous version array. The optimized algorithm dependent on the aggregation function can optionally be selected from a plurality of algorithms, the selecting comprising assessing one or more attributes of the database table in relation to a set of optimization criteria for each of the plurality of algorithms. The traversing can optionally include one or more of incrementing a variable (for example a single variable for aggregation functions such as sum and count) based on changes to the values at each commit identifier, creating a chained list corresponding to each commit identifier, and creating a sorted list corresponding to each commit identifier. The calculated metric can optionally include one or more of a sum, a count, an average, a minimum value, a maximum value, a median, a mode, and skewness. The ordered history table can optionally be generated by sorting the history table sequentially by the commit identifiers. If the history table is in a natural order it may not need to be sorted again.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 shows an example of a history table;

FIG. 6A shows another example of a data structure that can be used to compute an aggregate value;

FIG. 6B and FIG. 6C show examples of algorithmic approaches to tracking invalidated values;

FIG. 9A and FIG. 9B are diagrams respectively showing examples of code and table operations required to perform another illustrative query;

When practical, similar reference numbers denote similar structures, features, or elements.

DETAILED DESCRIPTION

To maintain access to temporal information regarding changes to the database, a transaction manager can maintain a history table or some other listing that maps CID integer numbers to the actual timestamps. Information stored in a history table can be useful for a number of business needs. One example of an illustrative use case is the calculation of an aggregated value at different points in time. An aggregated value can be a sum, a count, an average, a minimum or maximum value, a median, a mode, a skewness, or one or more other statistical or numerical representations of information pertaining to a data set. This type of query cannot generally be expressed concisely in using SQL or other relational database management system programming languages. Furthermore, execution of such a query using a brute force computational approach can be unacceptably processor intensive and therefore a substantial drain on system resources. For this reason, a more elegant representation in SQL (or the like) by means of an extension of the current programming language standard and an efficient implementation are desirable.

Figures 1A, 1B:
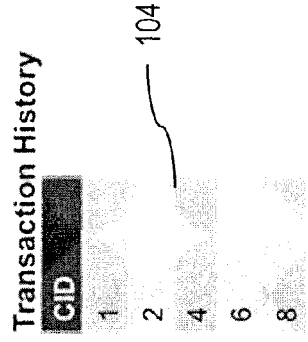
FIG. 1A and FIG. 1B are diagrams respectively showing examples of code and table operations required to perform an illustrative query.

In currently available approaches, calculation of an aggregated value grouped by time can be complicated and very computation intensive. A simplified example of a query that can require time-sensitive aggregation is a request for a maximum number of products that were out of stock (stock total=0) during a period of time. An example of a SQL code segment 100 for computing a response to this query is shown in FIG. 1A. This code segment, which requires a join of a commit ID history table 102 with a transaction history table 104 as shown in FIG. 1B, can be extremely slow for moderate to large sized transaction tables, even on very high performance computing systems. The reason for this high system resource load can be traced at least in part to the inefficient execution of such queries using currently available approaches. For example, it can be necessary to traverse every CID to identify how each data value has changed, and recursion across already traversed values generally cannot be avoided. Calculation of very large cross-products can be required, such that the size of the cross-product and, consequently, the execution time for the query can scale with the square of the size of the table. Additionally, coding of the query can require a fairly complicated syntax, which can potentially lead to coding errors. Further difficulties can arise due to challenges with optimizing the join conditions necessary to handle the time ranges. In general, efficient algorithms for performing such calculations are not currently available.

To address these and potentially other issues with currently available solutions, methods, systems, articles of manufacture, and the like consistent with one or more implementations of the current subject matter can, among other possible advantages, provide a time-slider operator or similar functionality that enables queries to calculate a certain state, aggregation, or the like for multiple (optionally all) points in time, for example for all or some commit ID points, at which the database has been modified. Using one or more features described herein or their functional equivalents, it is possible to express such queries in a more concise manner while also enabling query optimizers to select more efficient code implementations. Implementations of the current subject matter are capable of streamlining the operations required for calculating aggregated metrics for complex and large database tables. Rather than scaling as the square of the size of the table, approaches similar to those described herein can advantageously scale linearly with the size of the table (depending on the aggregation function used) if the table is sorted by the "CID from" column 206, and can make use of coding strategies make queries concise and easier to understand. In some implementations, the history table can operate in an append mode where the "sort on CID from" order is naturally given. Some state-of-the-art databases can include the ability to detect and exploit such sorting on the "CID from" column 206.

A group operator, which can be expressed at a high level as "group by CID( )" can be used to aggregate by a type of change event. The CID can be a virtual attribute, and need not be persisted. More detail on this issue is provided below. Interval operators can be used to limit the time range for the operations to the range necessary to answer the query.

Consistent with one or more implementations, an aggregated value can be calculated for each CID in the history table. This calculation can support a variety of different aggregation functions (e.g. min, max, average, count, sum, median, and the like).

Implementations of the current subject matter can also address one or more potential issues associated with previously available approaches to calculating aggregated values in large database tables. These issues can include, but are not limited to reducing the need for storage of the values to be aggregated, handling of intermediate results representing values valid at a certain CID, optimization of storage type based on aggregation function, and the like. As part of a calculation, it can be necessary to identify the values in the table that have been invalidated in time so that these values can be removed from the intermediate results. As described herein, an approach consistent with the current subject matter can include incremental computation of the aggregate function, which is calculated for each CID in the history table as the history table is traversed in a single pass.

FIG. 2 illustrates some feature of such an approach using a simplified example of a history table 200 that includes a sequential listing of changes to values of records identified by a row or record identifier as in the "ID" column 202. The "value" column 204 lists a value for the record or row identified in the ID column 202, and the "CID from" column 206 and "CID to" column 210 respectively indicate the CID values between which the value in the value column 204 is valid for the identified record or row. For example, in FIG. 2, the value of record or row ID 1 was changed from 2 to 5 at CID 4.

As part of an approach consistent with implementations of the current subject matter, the history table can be sorted on the "CID from" column 206. Alternatively, as noted above, some modern database management programs can include the ability to detect and exploit a directly provided "CID from" sorting. The sorted list of CIDs can be traversed sequentially and in one pass. At each CID, the aggregated value stored in a single variable can be recalculated according to the value of the record or column row at that CID.

Figure 3:
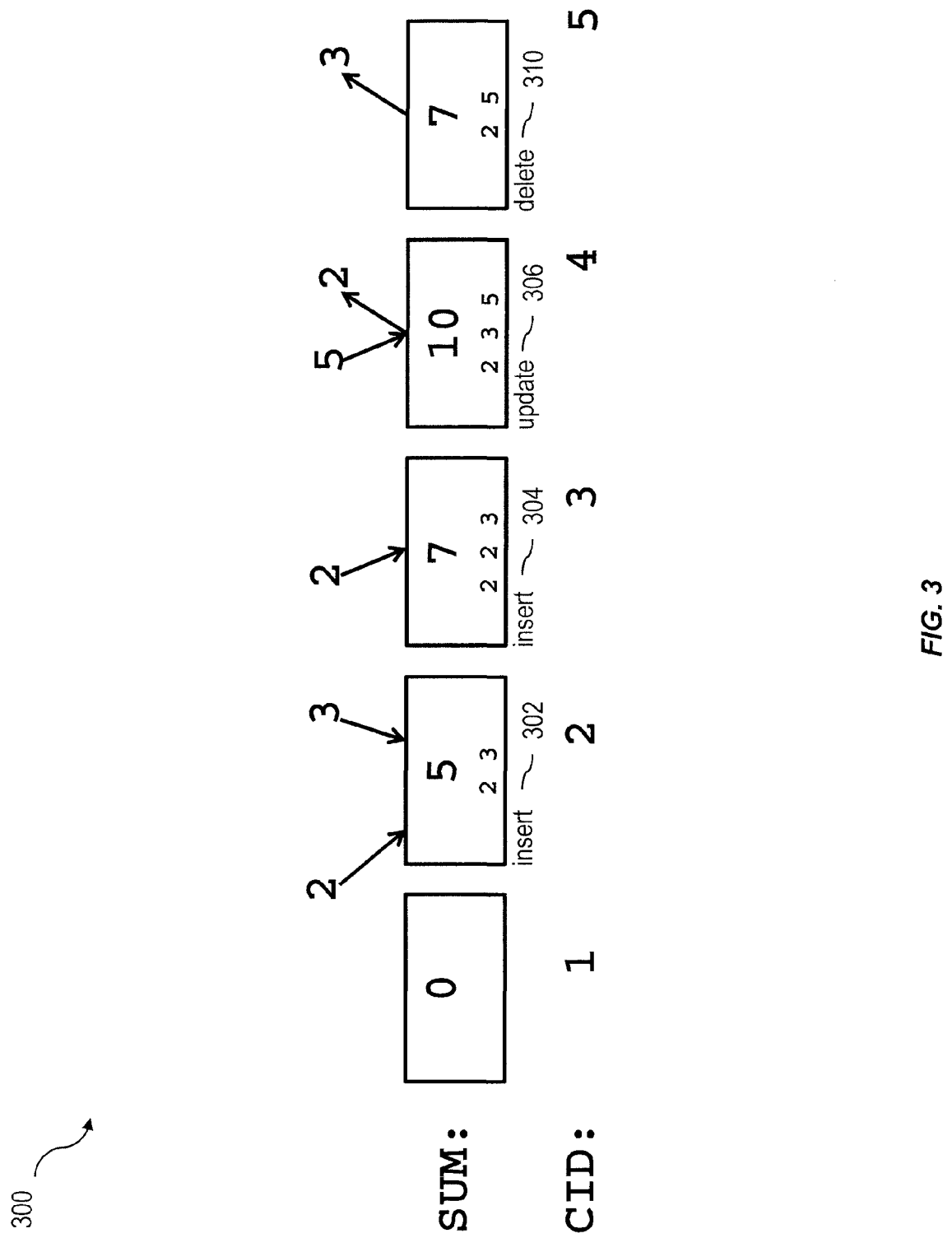
FIG. 3 shows an example of traversing a sorted history table to calculate an aggregation such as a sum.

FIG. 3 shows a diagram 300 illustrating an example of an implementation of the current subject matter in which the aggregation function is a summation. A similar approach can be sued for other summation functions, such as a count, an average, or the like, which do not rely on knowledge of a structure of the data being aggregated. The history table 200 in FIG. 2 can be sorted according to the "CID from" column 206, or the CID from ordering can be naturally obtained from a database management program that provides it without an explicit sort function. An aggregation function, in this example as sum of the values, can be calculated by traversing the sorted history table 200. At CID 1, the value is empty. Then, at CID 2, an insert 302 occurs in which the values 2 and 3 are inserted (e.g. per the first two rows of the history table 200 in FIG. 2), yielding a current sum of 5. At CID 3, a third value, 2, is inserted in a second insert 304 (e.g. per the third row of the history table 200 in FIG. 2), which yields a current sum of 7. At CID 4, an update 306 occurs to the first value such that the first value changes from 2 to 5 (e.g. per the fourth row of the history table 200 in FIG. 2) and the sum is updated to 10. Continuing with the example past what is shown in the history table 200 of FIG. 2, the CID 5 can be a delete 310 of the second value (which had been 3), thereby causing the sum to be reduced to 7.

Figure 4:
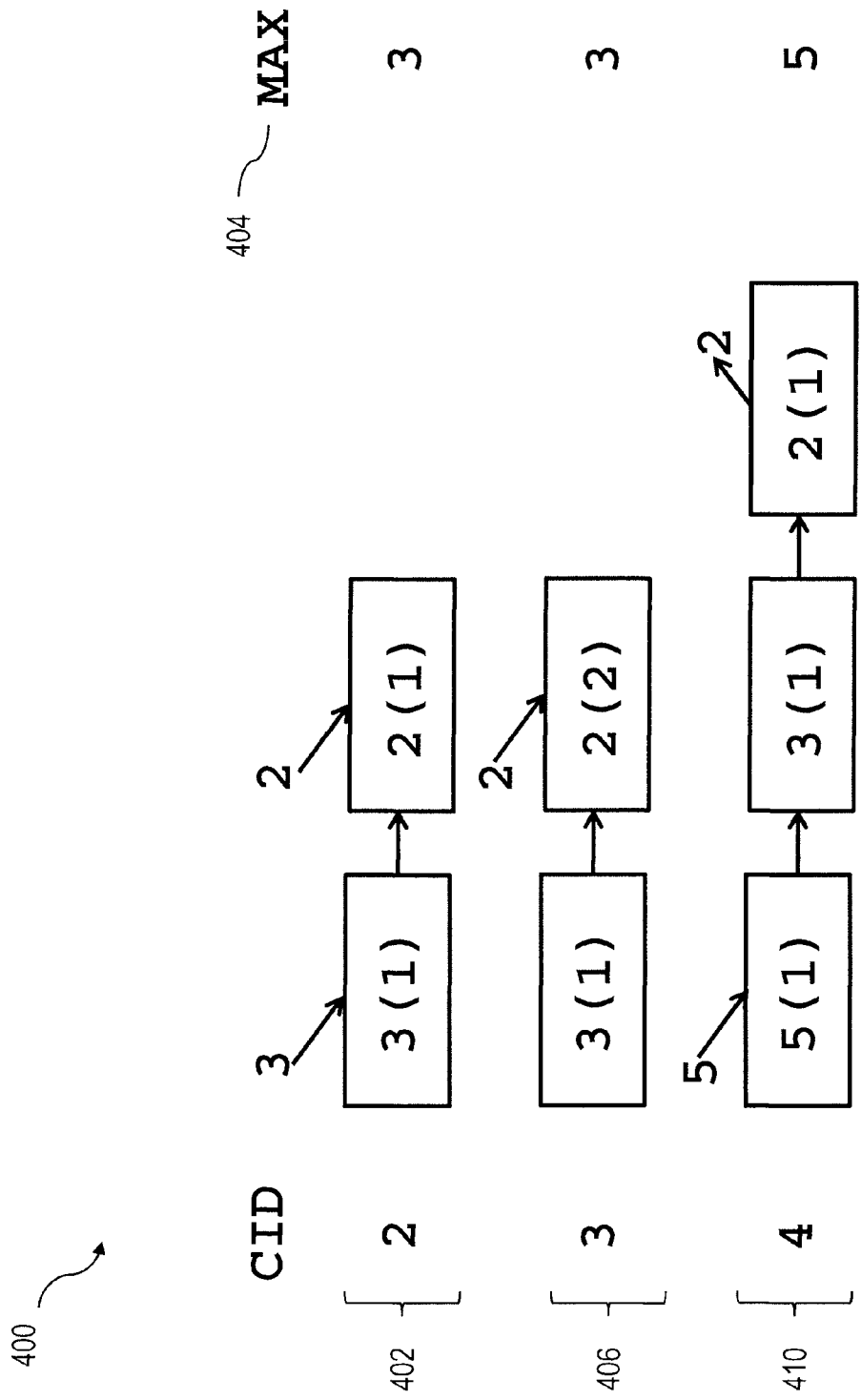
FIG. 4 shows an example of traversing a sorted history table to calculate an aggregation such as a maximum.

FIG. 4 shows a diagram 400 illustrating an example of an implementation of the current subject matter in which the aggregation function is a calculation of a maximum value.

Such an approach can also be used for other aggregation functions, such as for example calculation of a minimum value, a median, or some other metric that requires construction of a chained list reflecting the current status of the values in the table, column, or the like. In this example, the aggregation function can store a chained list sorted by values, with a counter indicating the number of instances of each value. Other implementations are also possible, for example a minimum/maximum heap or array. Referring again to the example history table 200 in FIG. 2, traversing the list sorted on the "CID from" column 206 results in formation of a first chained list 402 based on CID 2, in which the first value in the list is 3 and the second value is 2 after their insertion. At this point in the traversal of the history table 200, the maximum value 404 is 3. At CID 3, the insertion of the third value 2 results in the second chained list 406, in which the maximum value 404 remains as 3 and the counter for the value 2 is incremented by one to indicate that two instances of that value are present. The counter can be necessary to maintain accuracy in the event that two occurrences of the maximum value (in this example) exist but only one is deleted according to a CID in the transaction table 200. As an illustration of this feature, upon traversing CID 4, in which the first value of 2 is updated to 5. The resultant third chained list 410 shows a new maximum value 404 corresponding to the newly inserted value of 5. The counter for the value of 2 can be reduced by 1 to reflect the update of the value from 2 to 5. For an aggregation function such as the maximum value or the minimum value, the lookup of the value can require only accessing the first value in the sorted list at a constant time. Similar advantages can be realized in a heap implementation. For aggregation functions such as the median or other more complex aggregation functions that require information about the structure of the data set, it is necessary to examine all entries in the list.

Figure 5:
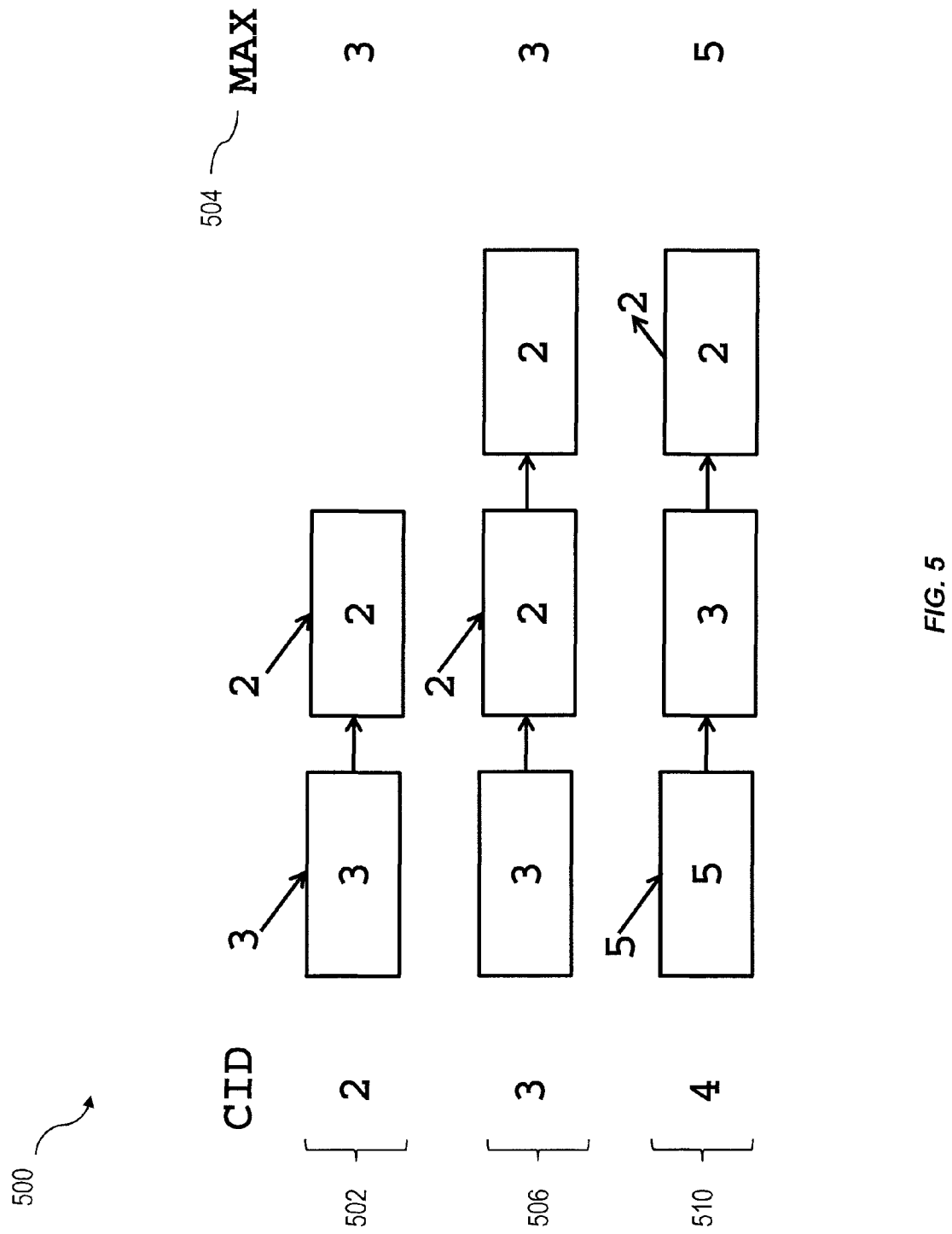
FIG. 5 shows another example of traversing a sorted history table to calculate an aggregation such as a maximum.

FIG. 5 shows a diagram 500 illustrating another example of an implementation of the current subject matter in which the aggregation function is a calculation of a maximum value. As with the approach illustrated in FIG. 4, this approach can also be used for other aggregation functions, including those requiring construction of a chained list reflecting the current status of the values in the table, column, or the like. Other possible data structures can include, but are not limited to, a heap, for examples as discussed above. In this example, the aggregation function can store a sorted list of values, in which duplicate values are included in the list. Referring again to the example history table 200 in FIG. 2, traversing the list sorted on the "CID from" column 206 results in formation of a first sorted list 502 based on CID 2, in which the first value in the list is 3 and the second value is 2 after their insertion. At this point in the traversal of the history table 200, the maximum value 404 is 3. At CID 3, the insertion of the third value 2 results in the second sorted list 506, in which the maximum value 404 remains as 3 and the second instance of the value 2 is added to the second sorted list 506. Upon traversing CID 4, in which the first value of 2 is updated to 5, the third sorted list 510 includes a new maximum value 404 corresponding to the newly inserted value of 5. One of the instances of the value 2 is removed form the third sorted list 510 to reflect the update of the value from 2 to 5.

In still another approach consistent with the current subject matter, a previous version array 600, such as that shown in FIG. 6A can be used to access the value of all rows, which were valid for each CID. It need be only one location in memory. The values in the previous version array 600 can be overwritten when a next CID is scanned. During a scan of the history table 200, a value is updated for each identifier (e.g. in ID column 202) such that the stored value is valid for that identifier for the current CID. This process is repeated for each CID. Accordingly, this approach can be less favorable for large tables due to the need to keep a copy of the entire history table for each CID. Only newly added rows need to be added to the history table while deleted or updated rows are removed. This is usually a very small fraction of the history table. Overall each row of the history table is added exactly once into this data structure. In this case no invalidation index is needed. Advantages can be realized, however, in that a linear scan of these copied tables is possible such that memory references can be reduced or even eliminated, which can substantially improve cache efficiency. In some examples, the copies can represent the set of visible row values.

An algorithm that can be used in conjunction with one or more implementations of the current subject matter can provide an efficient way to access a value when a previous version of the field, record, etc. holding the value is invalidated. In one example, an invalidation index 602, such as the example shown in FIG. 6B, can be formed. The "CID to" column 210 of the history table is indexed to the positions in the history table at which values are invalidated, either by deletion or by being updated to another value. The invalidation index 602, which needs to be calculated only once and then merely appended as additional updates or deletions occur, thusly includes a list of tuples that are invalidated for each CID. This invalidation index provides an explicit listing of positions within the history table at which invalidations occur and can be beneficial in situations in which a relatively small number of updates or deletions have or are likely to occur and in which positions in the history table are stored with convenient position identifiers.

Another option for recording where invalidation of values occurs is the use of a separate bitlist of invalidated tuples for each CID as illustrated in the table of bitlists 604 of FIG. 6C. In this example, each CID has its own bitlist that indicates whether an invalidation was committed by that CID at each position in the history table 200. This approach can be beneficial in situations in which a large number of deletion have or are expected to occur and if compression is available (for example run-length compression).

Figure 7:
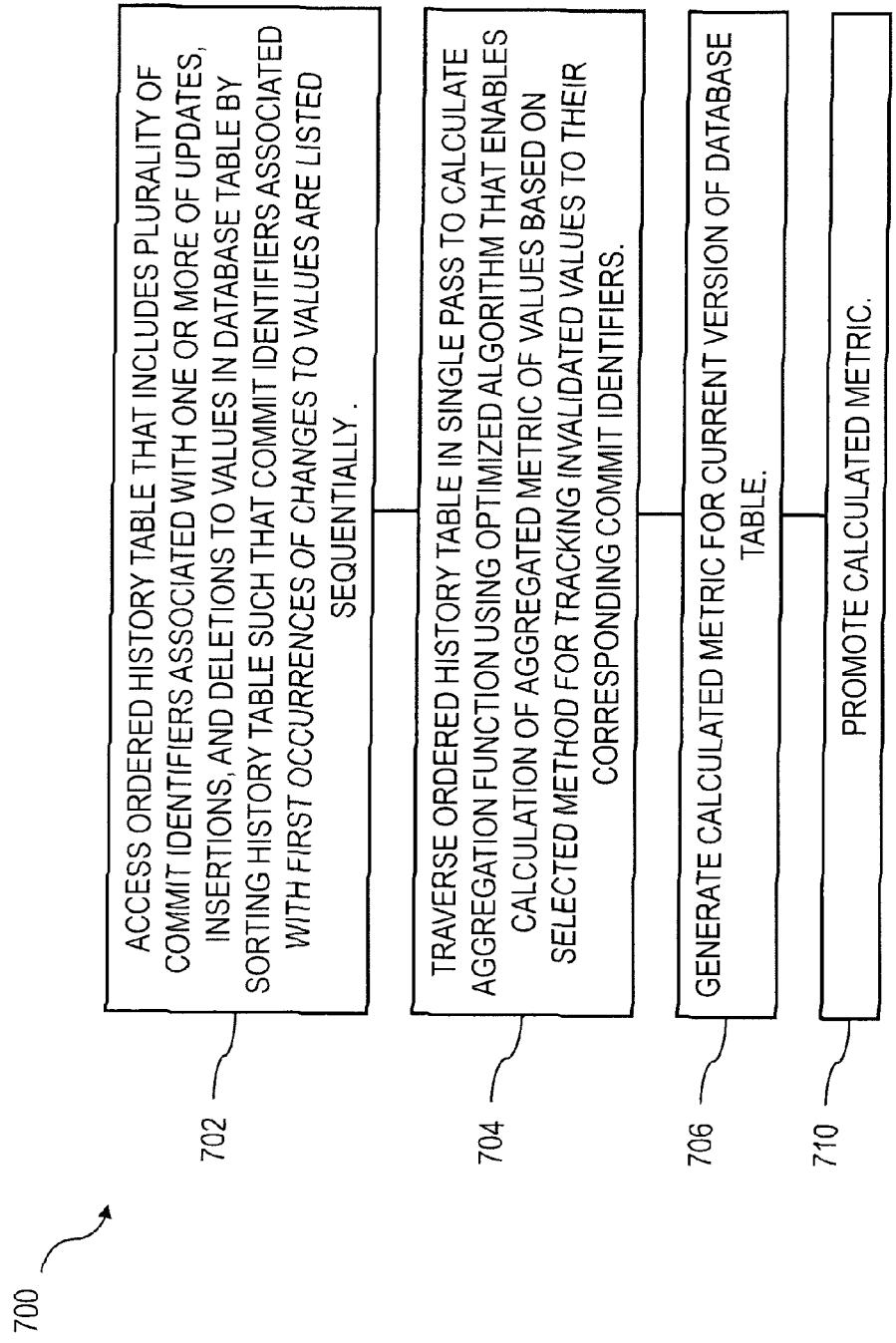
FIG. 7 is a process flow diagram illustrating aspects of a method having one or more features consistent with implementations of the current subject matter.

FIG. 7 shows a process flow chart 700 illustrating method features, one or more of which can be included in implementations of the current subject matter. At 702, an ordered history table of a database is accessed. The ordered history table can be obtained via a database program that directly output CID from ordering, for example as discussed above. Alternatively, the ordered history table can be prepared by sorting a history table on the CID from values. The history table includes a plurality of commit identifiers (CIDs) associated with one or more of updates, insertions, and deletions to values in the database table. The ordered table can include a sequential listing of the CIDs associated with first occurrences of changes to one or more of the values. At 704, the ordered history table is traversed, for example in a single pass, to calculate an aggregation function using an optimized algorithm. The optimized algorithm, which can include one or more features consistent with the examples discussed above in reference to FIG. 6B or FIG. 6C, can enable calculation of an aggregated metric of the values based on selected method for tracking invalidated values to their corresponding CIDs.

At 706, the calculated metric is generated for a current version of the database table, and the calculated metric is promoted at 710. The promoting can include one or more of storing the calculated metric, presenting the calculated metric via a user interface display, sending an electronic message comprising the calculated metric, or some other means of persisting the calculated metric or providing it for review by one or more persons or for use by one or more other automated processes (e.g. a software program, a hardware implementation of one or more features based on the calculated metric, a combination of such processes, or the like).

Figure 8:
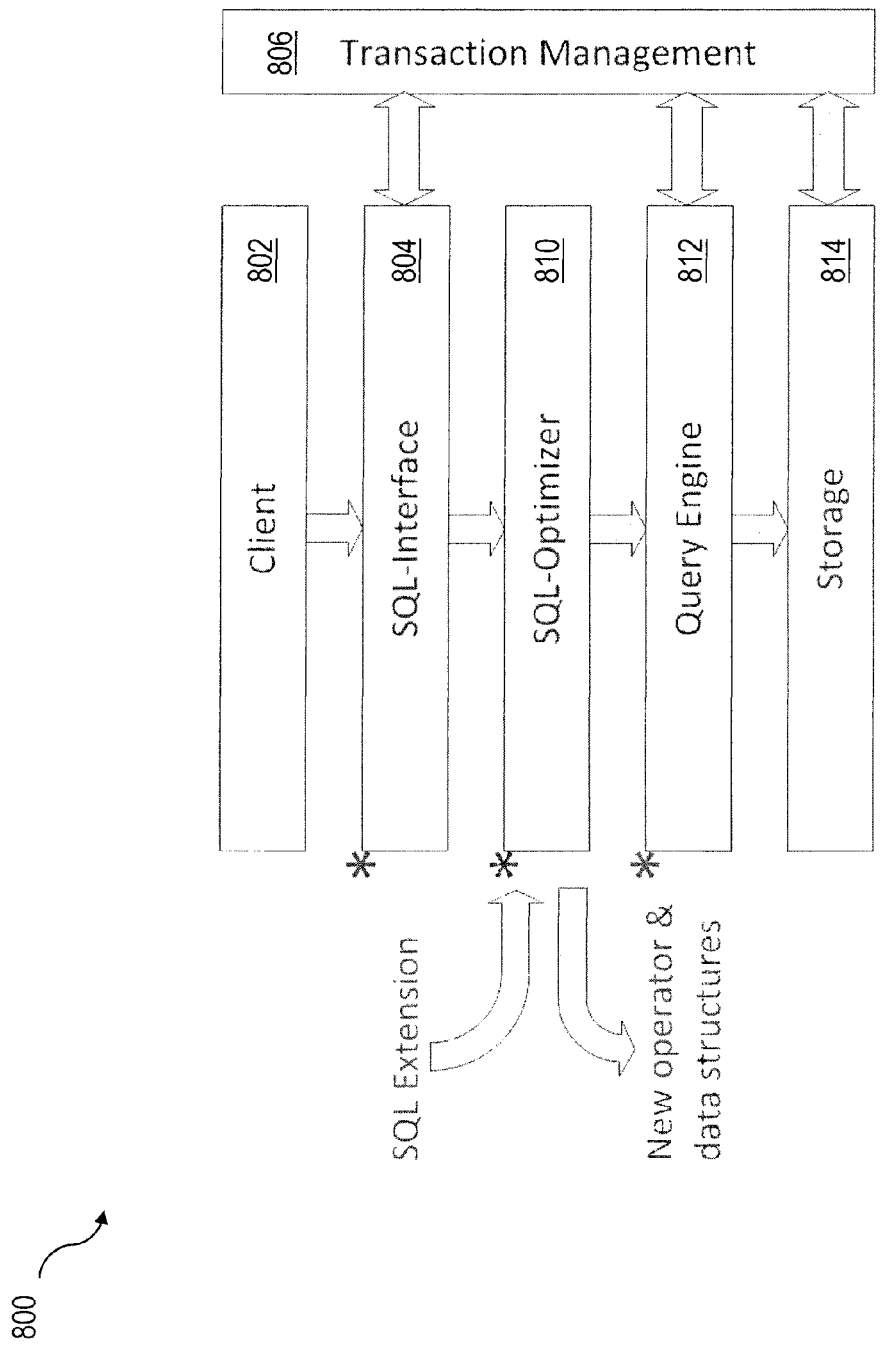
FIG. 8 illustrates an example of canonical layers of a database architecture while highlighting components that can require adaptation or extension for use with implementations of the current subject matter.

FIG. 8 shows an illustration 800 of layers that can be involved in an aggregation calculation as discussed herein. A client 802 can submit an aggregation request to a SQL interface 804 of a database management system. The SQL interface 804, in conjunction with operations of a transaction manager 806 and a SQL optimizer 810, can call optimized SQL extensions as well as operators and data structures consistent with implementations of the current subject matter and pass an aggregation query to a query engine 812. The query engine can obtain the necessary dataset tables, history tables, and the like from storage, which can be any kind of computer readable storage medium, either local or accessible via a network.

Another illustrative example of a query that can be supported by an implementation of the current subject matter is a request for a maximum number of unshipped orders, for example over the entire history spanned by the available database or over some indicated time interval. The first example section of code 900 in FIG. 9A shows how such query can be implemented in SQL without the use of an improved operator consistent with implementations of the current subject matter. The inner query in the section of code 900 retrieves the number of unshipped orders for every CID (i.e. every time the database is updated) or in a certain validity interval ([T_BEGIN], [T_END]). Tests of the execution of this query have proven to be extremely expensive because of the generation of very large intermediate results caused by the join of the table with all possible CIDs.

The second example section of code 902 in FIG. 9B shows a query using a SQL extension for a time-slider operator consistent with implementations of the current subject matter. Depending on the type of interval in history the appropriate VISIBLE AT operator can be chosen. The aggregation can be calculated for every CID in the selected interval during a single pass through the history table, which can yield substantial benefits in efficiency of execution and reduction or minimization of processing loads. Additionally, the SQL extension can provide a much more concise syntax and also provide hints to the optimizer to enable selection of a more efficient algorithm. As shown, the semantics of calculating a certain state for every CID can be expressed by group by tableName.CID( ). The function syntax of CID( ) can emphasize that the CID is not a physical attribute. In addition, the VISIBLE AT operator can be applied to expose different versions. This approach, as noted above, facilitates an execution time that scales at least approximately linear to the size of the table as the table is scanned and a state of the aggregation function is maintained and adapted as each new value is read during traversal of the history table sorted on the "CID from" column 206. Each aggregation function (e.g. SUM, AVG, MAX, MIN, etc.) can be supported by a separate implementation of the operator.

Figure 10:
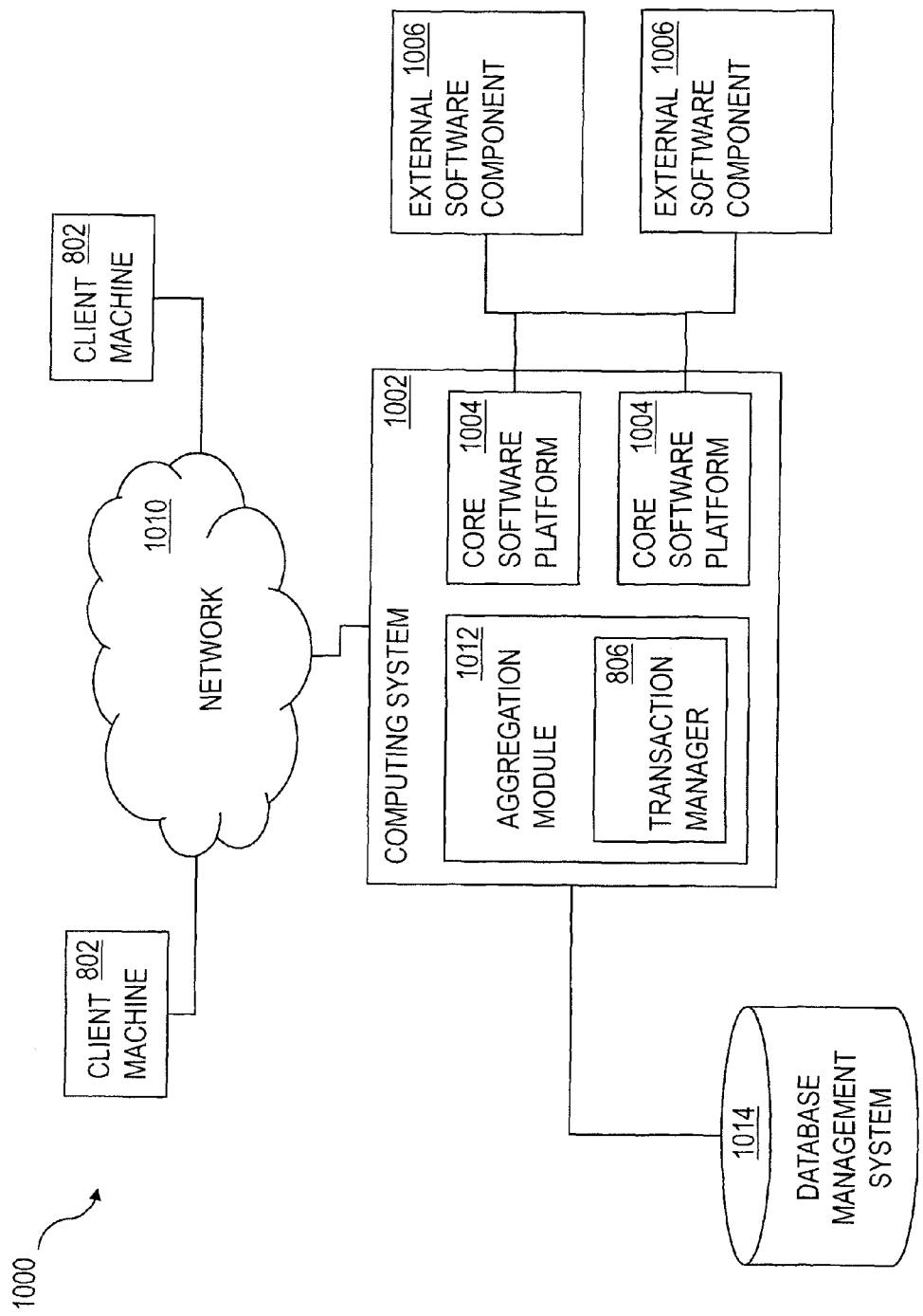
FIG. 10 is a diagram illustrating features of a business software system architecture consistent with at least some implementations of the current subject matter.

Consistent with some implementations of the current subject matter, the core software platform of an enterprise resource planning (ERP) system, other business software architecture, or other data-intensive computing application or software architecture can be provided as a standalone, customized software installation that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 10 shows a diagram of a system consistent with such an implementation. A computing system 1002 can include one or more core software platform modules 1004 providing one or more features of the business software system. The computing system can also aggregate or otherwise provide a gateway via which users can access functionality provided by one or more external software components 1006. Client machines 802 can access the computing system, either via a direct connection, a local terminal, or over a network 1010 (e.g. a local area network, a wide area network, a wireless network, the Internet, or the like).

An aggregation module 1012 or other comparable functionality, which can optionally include or have access to a transaction manager 806 or comparable functionality, can perform one or more of the features or functions discussed herein, and can access a database management system 1014 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 1014 can include parallelization features consistent with those described herein.

Figure 11:
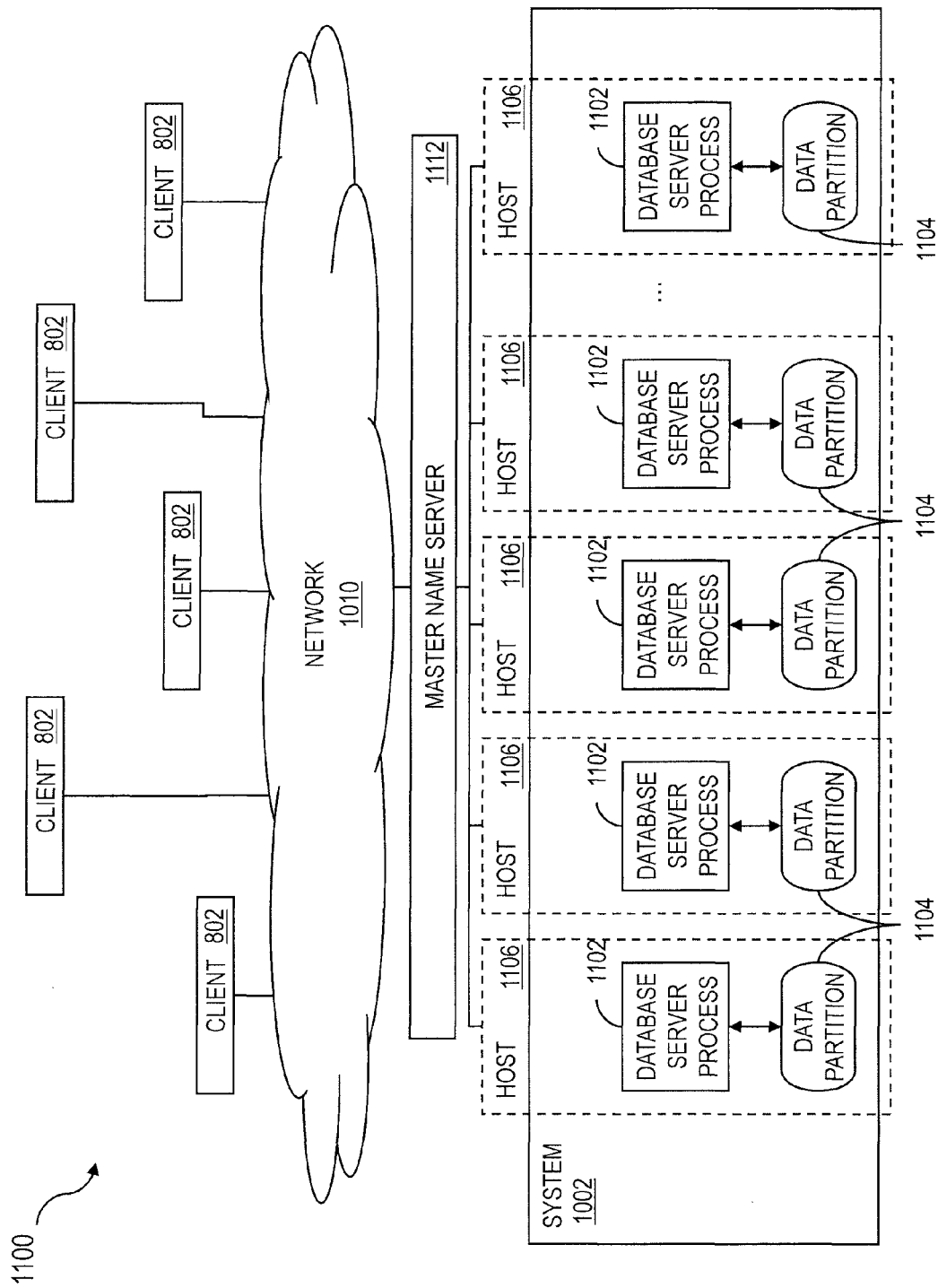
FIG. 11 is a diagram illustrating features of a database management system architecture consistent with at least some implementations of the current subject matter.

For data distribution purposes, tables or ranges within tables can be assigned to different database partitions that are assigned to different hosts, for example for scalability reasons. FIG. 11 shows an example of an enterprise resource system architecture 1100 consistent with an implementation that includes data distribution for scalability reasons. Such a configuration can be used for large, on-premise or standalone systems with high performance requirements. Each data server process 1102 and its associated data partition 1104 can be assigned to a discrete host 1106. A host 1106 can be a standalone machine with one or more physical processors or a virtual machine on a larger system 1002 as depicted in FIG. 11. A central component, labeled as a name server 1112 in FIG. 11, knows the topology of the system and how data is distributed. In a system with data distribution, the name server knows which tables or partitions of tables are located on which data server process 1102. One or more clients 1114 (e.g. client machines 802) can access the name server 1112, either via a direct connection or over a network 1116.

In a data distribution scenario, the partitioning can be done table wise or also by splitting tables. With table wise partitioning, the name server assigns new tables to a database server process 1102 based on the current distribution of tables (number of tables assigned to each database server process 1102). Then data for this table will reside only on that database server process 1102. It is also possible to specify that a table is split over multiple database server processes 1102. The name server 1112 can optionally partition the table based on a size estimation specified by the application. When records are inserted into a split table, the records can be distributed to other database server processes 1102 based on name server information.

Smaller organizations can also benefit from use of business software functionality. However, such an organization may lack the necessary hardware resources, IT support, and/or consulting budget necessary to make use of a standalone business software software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 12:
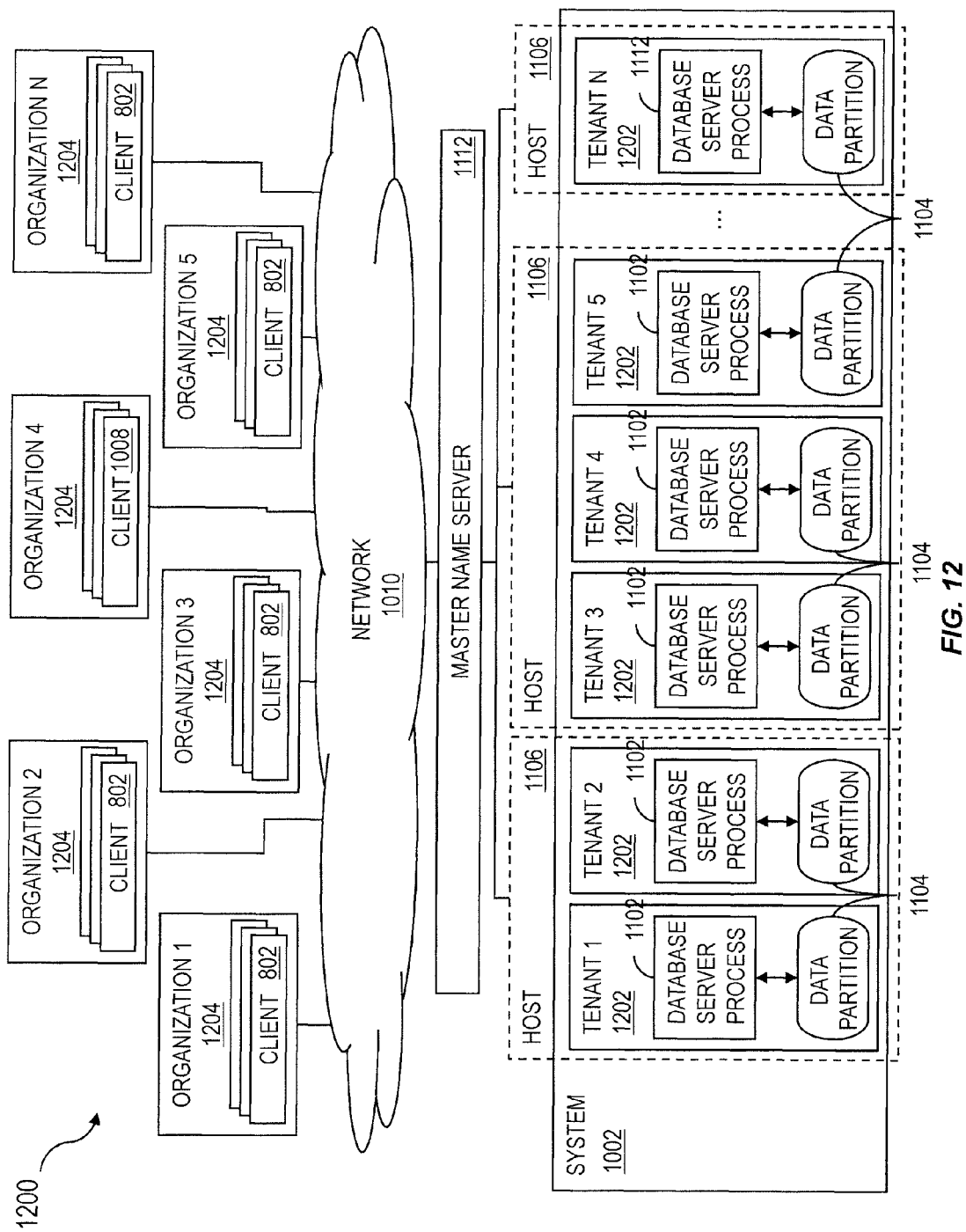
FIG. 12 is a diagram illustrating features of another database management system architecture consistent with at least some implementations of the current subject matter.

Data partitioning consistent with implementations of the current subject matter can also be used in a multi-tenancy environment as illustrated in the system architecture 1200 of FIG. 12. Multiple tenants 1202, each isolated from one another and available to be accessed by clients 1114 within a separate organization 1204 of a plurality of organizations via a network 1116, can be hosted by a same host 1106, which can be a virtual machine on a larger system 1002 as shown in FIG. 12 or a separate system that includes one or more physical processors. Tenants 1202 can also optionally be distributed across multiple database server processes 1102 on more than one host 1106. In this manner, tables or ranges within tables are assigned to different database server processes 1102 that are assigned to different hosts 1106 for scalability reasons. One or more tenants 1202 can alternatively be served by a single database server process 1102 accessing a data partition 1104 (or multiple data partitions 1104) for the respective tenant 1202 that is isolated from other tenants 1202.

Figure 13:
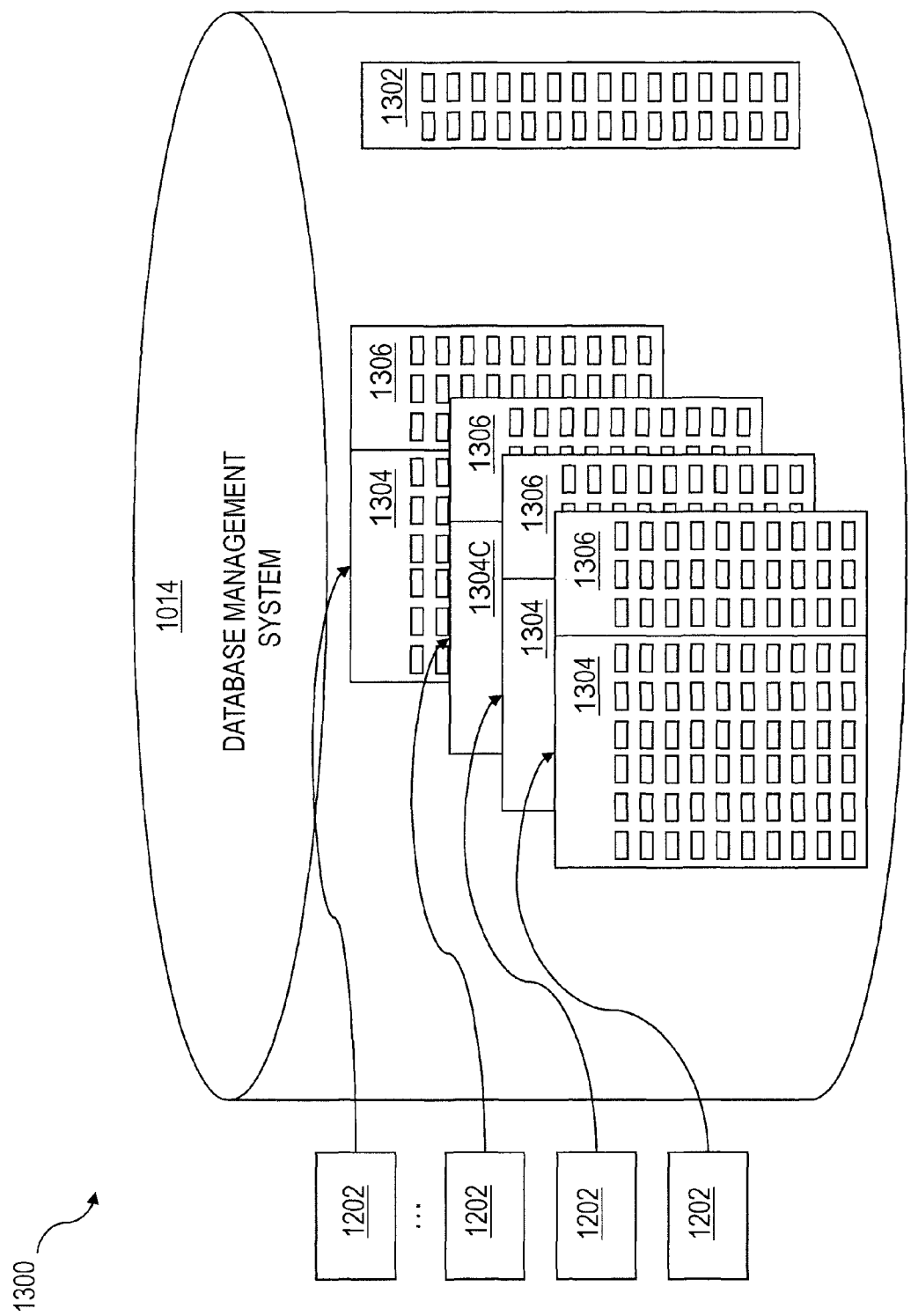
FIG. 13 is a diagram illustrating features of a multi-tenancy database structure consistent with at least some implementations of the current subject matter.

To provide for customization of the business process for each of multiple organizations supported by a single software delivery architecture 1200, the data and data objects stored by a database management system 1014 can include three types of content as shown in FIG. 13: core software platform content 1302 (e.g. a standard definition of a business process), system content 1304, and tenant content 1306. Core software platform content 1302 includes content that represents core functionality and is not modifiable by a tenant. System content 1304 can in some examples be created by the runtime of the core software platform and can include core data objects that store concrete data associated with specific instances of a given business process and that are modifiable with data provided by each tenant. The data retained in these data objects are tenant-specific: for example, each tenant 1202 of the group of tenants can store information about its own inventory, sales order, etc. Tenant content 1306 for isolated to each tenant 1202 of the group of tenants includes data objects or extensions to other data objects that are customized for one specific tenant 1202 of the group of tenants to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 1306 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 1302 and system content 1304 and tenant content 1306 of a specific tenant 1202 of the group of tenants are accessed to provide the business process definition and/or the status information relating to a specific instance of the business process according to customizations and business data of that tenant such that each tenant 1202 of the group of tenants is provided access to a customized solution whose data are available only to users from that tenant 1202.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A non-transitory computer program product storing instructions that, when executed by at least one programmable processor, cause the at least one programmable processor to perform operations comprising:
   accessing an ordered history table of a relational database, the ordered history table comprising a plurality of commit identifiers corresponding to one or more of respective updates, insertions, and deletions to values in a database table, the ordered history table being further sorted by a sequential listing of the commit identifiers identifying first occurrences of respective changes to one or more of the values;
   calculating an aggregation function by traversing the sequential listing of the commit identifiers in a single pass using an optimized algorithm, the aggregation function comprising an aggregated metric of the values that correspond to a current version of the database table, the calculating comprising calculating the aggregated metric based on tracking invalidated values to their corresponding commit identifiers in the ordered history table using one or more of an invalidation index, a separate bitlist for each of the commit identifiers, or a previous version array generated by the optimized algorithm; and
   promoting the calculated aggregated metric.

2. A computer program product as in claim 1, wherein the promoting comprises one or more of storing the aggregated metric, presenting the aggregated metric via a user interface display, and sending an electronic message comprising the calculated metric.

3. A computer program product as in claim 1, wherein the operations further comprise selecting the optimized algorithm dependent on the aggregation function from a plurality of algorithms, the selecting comprising assessing one or more attributes of the database table in relation to a set of optimization criteria for each of the plurality of algorithms.

4. A computer program product as in claim 1, wherein the traversing comprises one or more of incrementing a variable based on changes to the values at each commit identifiers, creating a chained list corresponding to each commit identifier, and creating a sorted list corresponding to each commit identifier.

5. A computer program product as in claim 1, wherein the aggregated metric comprises one or more of a sum, a count, an average, a minimum value, a maximum value, a median, a mode, and skewness.

6. A system comprising:
at least one programmable processor; and
a machine-readable medium storing instructions that, when executed by the at least one programmable processor, cause the at least one programmable processor to perform operations comprising:
accessing an ordered history table of a relational database, the ordered history table comprising a plurality of commit identifiers corresponding to one or more of respective updates, insertions, and deletions to values in a database table, the ordered history table being further sorted by a sequential listing of the commit identifiers identifying first occurrences of respective changes to one or more of the values;
calculating an aggregation function by traversing the sequential listing of the commit identifiers in a single pass using an optimized algorithm, the aggregation function comprising an aggregated metric of the values that correspond to a current version of the database table, the calculating comprising calculating the aggregated metric based on tracking invalidated values to their corresponding commit identifiers in the ordered history table using one or more of an invalidation index, a separate bitlist for each of the commit identifiers, or a previous version array generated by the optimized algorithm;
and
promoting the calculated aggregated metric.

7. A system as in claim 6, wherein the promoting comprises one or more of storing the aggregated metric, presenting the aggregated metric via a user interface display, and sending an electronic message comprising the aggregated metric.

8. A system as in claim 6, wherein the operations further comprise selecting the optimized algorithm from a plurality of algorithms, the selecting comprising assessing one or more attributes of the database table in relation to a set of optimization criteria for each of the plurality of algorithms.

9. A system as in claim 6, wherein the traversing comprises one or more of incrementing a variable based on changes to the values at each commit identifiers, creating a chained list corresponding to each commit identifier, and creating a sorted list corresponding to each commit identifier.

10. A system as in claim 6, wherein the aggregated metric comprises one or more of a sum, a count, an average, a minimum value, a maximum value, a median, a mode, and a skewness.

11. A computer-implemented method performed by one or more programmable processors, the computer-implemented method comprising:
accessing an ordered history table of a relational database, the ordered history table comprising a plurality of commit identifiers corresponding to one or more of respective updates, insertions, and deletions to values in a database table, the ordered history table being further sorted by a sequential listing of the commit identifiers identifying first occurrences of respective changes to one or more of the values;
calculating an aggregation function by traversing the sequential listing of the commit identifiers in a single pass using an optimized algorithm, the aggregation function comprising an aggregated metric of the values that correspond to a current version of the database table, the calculating comprising calculating the aggregated metric based on tracking invalidated values to their corresponding commit identifiers in the ordered history table using one or more of an invalidation index, a separate bitlist for each of the commit identifiers, or a previous version array generated by the optimized algorithm;
and
promoting the calculated aggregated metric.

12. A computer-implemented method as in claim 11, wherein the promoting comprises one or more of storing the aggregated metric, presenting the aggregated metric via a user interface display, and sending an electronic message comprising the aggregated metric.

13. A computer-implemented method as in claim 11, further comprising selecting the optimized algorithm from a plurality of algorithms, the selecting comprising assessing one or more attributes of the database table in relation to a set of optimization criteria for each of the plurality of algorithms.

14. A computer-implemented method as in claim 11, wherein the traversing comprises one or more of incrementing a variable based on changes to the values at each commit identifiers, creating a chained list corresponding to each commit identifier, and creating a sorted list corresponding to each commit identifier.

15. A computer-implemented method as in claim 11, wherein the aggregated metric comprises one or more of a sum, a count, an average, a minimum value, a maximum value, a median, a mode, and a skewness.

16. The computer-implemented method as in claim 11, the optimized algorithm further performing operations comprising generating an invalidation index.

17. The computer-implemented method as in claim 11, the optimized algorithm further performing operations comprising generating a separate bitlist for each of the commit identifiers.

18. The computer-implemented method as in claim 11, the optimized algorithm further performing operations comprising generating a previous version array.

* * * * *